(12) United States Patent
Wang et al.

(10) Patent No.: US 7,982,733 B2
(45) Date of Patent: Jul. 19, 2011

(54) RENDERING 3D VIDEO IMAGES ON A STEREO-ENABLED DISPLAY

(75) Inventors: Haohong Wang, San Jose, CA (US); Hsiang-Tsun Li, San Diego, CA (US); Sharath Manjunath, San Diego, CA (US); Yingyong Qi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1195 days.

(21) Appl. No.: 11/620,621

(22) Filed: Jan. 5, 2007

(65) Prior Publication Data
US 2008/0165181 A1 Jul. 10, 2008

(51) Int. Cl.
*G06T 15/40* (2006.01)
(52) U.S. Cl. ........................................ 345/421; 345/419
(58) Field of Classification Search .................. None
See application file for complete search history.

(56) References Cited

U.S. PATENT DOCUMENTS

| | | | |
|---|---|---|---|
| 6,501,471 B1* | 12/2002 | Venkataraman et al. | 345/424 |
| 6,559,844 B1* | 5/2003 | Alamparambil | 345/427 |
| 6,940,473 B2* | 9/2005 | Suyama et al. | 345/6 |
| 6,963,431 B2* | 11/2005 | Holzbach et al. | 359/23 |
| 7,088,364 B2 | 8/2006 | Lantin | |
| 2002/0154214 A1 | 10/2002 | Scallie et al. | |
| 2007/0002130 A1 | 1/2007 | Hartkop | |

FOREIGN PATENT DOCUMENTS

| | | |
|---|---|---|
| EP | 1739978 | 1/2007 |
| GB | 2394850 | 5/2004 |
| JP | 10232953 A | 9/1998 |
| JP | 2003009181 A | 1/2003 |
| WO | 0011605 | 3/2000 |

OTHER PUBLICATIONS

International Search Report, PCT/US08/050025, International Search Authority, European Patent Office, May 21, 2008.
Written Opinion PCT/US08/050025, International Search Authority, European Patent Office, May 21, 2008.
Stoev et al., "Accelerated Rendering in Stereo-Based Projections," Proceedings of the 3rd International Conference on Collaborative Virtual Environments, Sep. 10-12, 2000, pp. 213-214, vol. Conf 3, Proceedings of the International Conference on Collaborative Virtual Environments, New York, NY, ACM, USA, XPO01075680.

(Continued)

*Primary Examiner* — Said Broome
(74) *Attorney, Agent, or Firm* — Timothy F. Loomis; James R. Gambale, Jr.

(57) ABSTRACT

The rendering of 3D video images on a stereo-enabled display (e.g., stereoscopic or autostereoscopic display) is described. The process includes culling facets facing away from a viewer, defining foreground facets for Left and Right Views and common background facets, determining lighting for these facets, and performing screen mapping and scene rendering for one view (e.g., Right View) using computational results for facets of the other view (i.e., Left View). In one embodiment, visualization of images is provided on the stereo-enabled display of a low-power device, such as mobile phone, a computer, a video game platform, or a Personal Digital Assistant (PDA) device.

52 Claims, 3 Drawing Sheets

OTHER PUBLICATIONS

Owens et al., "Media Processing Applications on the Imagine Stream Processor," Proceedings 2002 IEEE International Conference on Computer Design: VLSI In Computers and Processors, Sep. 16-18, 2002, pp. 295-302, International Conference on Computer Design, Los Alamitos, CA, USA, XP010619757.

Gudukbay et al., "Stereoscopic View-Dependent Visualization of Terrain Height Fields," IEEE Transactions on Visualization and Computer Graphics, Oct. 2002, pp. 330-345, vol. 8, No, 4, IEEE Service Center, Los Alamitos, CA, USA, XP011095049.

Brettle and Baranoski, "Stereo Rendering An Overview." Technical Report: CS-2005-02, 2005, pp. 1-7, XP002478310.

* cited by examiner though for processing, include Left View background facets corresponding to scene elements disposed beyond the pre-determined depth threshold.

RENDERING 3D VIDEO IMAGES ON A STEREO-ENABLED DISPLAY

BACKGROUND

I. Field

The present disclosure relates generally to the field of computer graphics and, more specifically, to techniques for efficiently rendering 3D images on a stereo-enabled display.

II. Background

Computational complexity of stereo video processing is a major factor in rendering of 3D graphics and, specifically, in visualization of 3D scenes and video games in low-power (i.e., battery-powered) devices, such as mobile phones, Personal Digital Assistant (PDA) devices, and the like.

In general, the difficulties in rendering of 3D graphics on a stereo-enabled display (e.g., autostereoscopic or stereoscopic display) come from the efficiency and reality aspects of the stereo video processing. Limited computational resources of the low-power devices may cause rendering of 3D graphics to be an excessively time-consuming routine. Despite the considerable efforts devoted to increasing performance of stereo video processing, further improvements would be desirable.

There is therefore a need in the art for techniques to efficiently implement reality-enhanced rendering of 3D video images on a stereo-enabled display.

SUMMARY

Techniques for efficient rendering of 3D video images on a stereo-enabled display are described herein. In an embodiment, during a 3D model-view transformation of video data, facets facing away from a viewer are culled. For a first view (for example, Left View), first foreground facets corresponding to scene elements disposed closer than a pre-determined depth threshold and first background facets corresponding to such elements disposed beyond the pre-determined depth threshold are selectively defined. For a second view, second foreground facets corresponding to the scene elements disposed closer than the pre-determined depth threshold are defined, whereas the first background facets are adopted as second background facets. Lighting is determined for the first foreground facets, the first background facets, and the second foreground facets. Screen mapping and scene rendering calculations are performed for the first view based on the first foreground facets and the first background facets, and based on the second foreground facets and the first background facets for the second view, respectively.

In one design, the method is used for visualization of video images on a stereoscopic or autosterescopic display of a battery-powered device, such as a mobile phone, a mobile computer, a video game platform, or a PDA device.

Various aspects and embodiments of the invention are described in further detail below.

Figure 1:
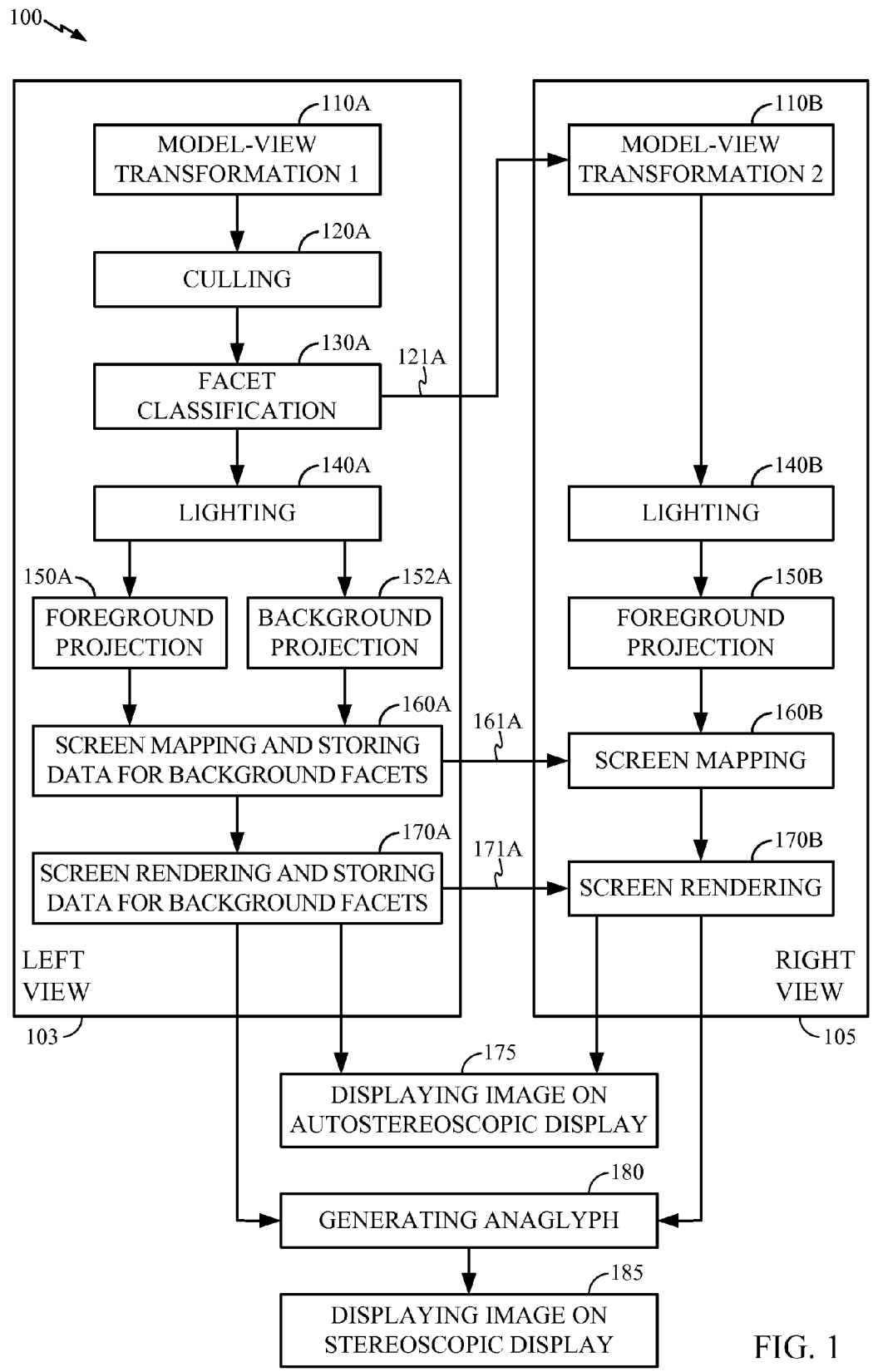
FIG. 1 shows a flow diagram illustrating a method for rendering 3D video images on a stereo-enabled display.

To facilitate understanding, identical reference numerals have been used, where possible, to designate identical elements that are common to the figures, except that suffixes may be added, when appropriate, to differentiate such elements. The images in the drawings are simplified for illustrative purposes and are not depicted to scale. It is contemplated that features or steps of one embodiment may be beneficially incorporated in other embodiments without further recitation.

DETAILED DESCRIPTION

Referring to the figures, FIG. 1 depicts a flow diagram illustrating a method 100 for rendering 3D video images on a stereo-enabled display in accordance with one embodiment of the present invention. In exemplary applications, the method 100 is used to reduce power consumption and complexity of calculations for displaying stereo graphics on battery-powered (i.e., low-power) devices and to improve performance and, specifically, depth and reality sensations of the visualized images. The battery-powered devices may include, without limitation, a mobile phone, a mobile computer, a video game platform, or a PDA device.

The method 100 generates separate views for the left and right eyes (i.e. Left and Right views) by visualizing a scene from different angles and observation points, where depth sensation is enhanced by reproducing binocular parallax caused by the interocular distance between viewer's eyes. The views are selectively guided to the left and right eyes of a viewer and, from the viewer's perspective, differences between the Left and Right views increase the depth and reality sensations.

Sequences of the method steps corresponding to rendering the Left and Right Views are denoted as 103 and 105, respectively. Hereafter, suffixes "A" and "B" are used to differentiate between processes that are performed on inputted video data for rendering the Left and Right Views. Illustratively, the suffix "A" identifies method steps performed for rendering the Left View.

In various embodiments, method steps of the method 100 are performed in the depicted order or at least two of these steps or portions thereof may be performed contemporaneously, in parallel, or in a different order. For example, steps 140A and 140B, or steps 160A and 170B may be performed contemporaneously or in parallel, and step 152A may be performed before step 150A. Those skilled in the art will readily appreciate that the order of executing at least a portion of other discussed below method steps, processes, or routines may also be modified.

At step 110A, a 3D model-view transformation of inputted video data is performed for the Left View. During a 3D model-view transform routine, a viewer is placed at a center facing the z-dimension of a 3D world coordinate system and geometric objects in the scene are mapped into Left View facets (e.g., triangle facets).

At step 120A, to save computational resources and, as such, increase efficiency of video processing, the facets that are facing away from the viewer (i.e., invisible to the viewer facets) are culled, or removed, from a database of the facets to be used for rendering the Left View.

At step 130A, the remaining Left View facets (i.e., facets corresponding to visible to the viewer's left eye elements of the geometric objects of the scene) are classified in two categories. A first category includes Left View foreground facets corresponding to scene elements disposed closer than a pre-determined depth threshold $Z_0$ (shown in FIG. 2). Accordingly, the second category includes Left View background facets corresponding to the scene elements disposed beyond the pre-determined depth threshold.

The classification of the facets is based on the observation that disparity between the geometric objects in the scene, as measured in units of pixels between image points in the Left and Right Views, decreases as a distance from the viewer to the objects increases and, eventually, becomes zero when these objects are disposed away far enough from the viewer.

The depth threshold $Z_0$ may be defined as a maximum distance from the viewer beyond which any object, when is observed by either one of the viewer's eyes, corresponds to the same pixels (discussed in detail below in reference to FIG. 2). Correspondingly, shading of the objects disposed beyond the depth threshold $Z_0$ may be performed for only one view (herein, the Left View), as discussed below in reference to steps 170A and 170B.

At step 140A, a lighting process is performed to determine color properties for the Left View foreground facets and the Left View background facets.

At step 150A, a 3D-to-2D perspective transformation is performed to project the Left View foreground facets onto a 2D image plane.

At step 152A, the 3D-to-2D perspective transformation is performed for the Left View background facets.

At step 160A, in the 2D image plane, a screen mapping process is performed for the Left View. The screen mapping process scales the Left View foreground facets and the Left View background facets to fit the size of a visible screen of the display, thus removing geometric objects or portions thereof that fall outside the screen. During step 160A, at least a portion of data corresponding to screen mapping of the Left View background facets is selectively saved in a respective memory medium (e.g., random access memory (RAM)) for a future use in calculations of the Right View, as discussed below in reference to step 160B.

At step 170A, a screen rendering process is performed for the Left View. The screen rendering process includes at least a portion of the following computational routines: (i) a shading routine determining intensity values for pixels rendering visible to the viewer portions of the Left View foreground and background facets, (ii) a Hidden Surface Removal (HSR) routine determining and removing invisible to the viewer portions of the Left View foreground and background facets, (iii) a texture mapping routine converting the visible Left View foreground and background facets into Left View object facets, and (iv) a blending routine selectively combining pixels of the Left View object facets to define properties of the pixels.

During step 170A, at least a portion of data corresponding to screen rendering of the Left View background facets is selectively saved in the memory medium for a future use in calculations of the Right View, as discussed below in reference to step 170B.

At step 110B, the 3D model-view transformation of the inputted video data is performed for the Right View. Using computational results of steps 120A and 130A (shown with a link 121A), during the transform routine vertices of triangle facets are filtered in a manner providing that only Right View foreground facets of visible to the viewer's right eye elements of the geometric objects are generated. Collectively, these Right View facets correspond to the scene elements disposed closer than the pre-determined depth threshold $Z_0$. In addition, the Left View background facets (defined at preceding step 130A) are adopted as Right View background facets.

Culling the facets facing away from the viewer based only on a one-side view (i.e., Left View) significantly reduces the amount of video data processing, but, in some instances, may cause approximation errors in rendering of the Right View. However, experiments and computer simulations have demonstrated that closeness of the viewer's eyes to one another allows, in most applications, to maintain such errors at an acceptably low level.

At step 140B, a lighting process is performed to determine color properties for the Right View foreground facets.

At step 150B, a 3D-to-2D perspective transformation projecting the Right View foreground facets onto a 2D image plane is performed.

At step 160B, in the 2D image plane, a screen mapping process is performed for the Right View. The screen mapping process of step 160B scales the Right View foreground facets to fit the size of the visible screen of the display and, additionally, adopts saved at step 160A computational results for screen mapping of the Left View background facets as screen mapping data for the Right View background facets (shown using a link 161A). In operation, utilization of the results of calculations performed during step 160A reduces an amount of data processing and computational complexity of the screen mapping process for the Right View.

At step 170B, a screen rendering process is performed for the Right View. The screen rendering process of step 170B includes at least a portion of the following computational routines: (i) a shading routine determining intensity values for pixels rendering visible to the viewer portions of the Right View foreground facets, (ii) a Hidden Surface Removal (HSR) routine determining and removing invisible to the viewer portions of the Right View foreground facets, (iii) adopting (shown using a link 171A) saved at step 170A results of screen rendering the Left View background facets as screen rendering data for the Right View background facets, (iv) a texture mapping routine converting the visible Right View foreground facets and the visible Left View background facets into Right View object facets, and (v) a blending routine selectively combining pixels of the Right View object facets to define properties of screen pixels.

Due to utilization of the results of calculations performed, at steps 160a and 170A, for the Left View background facets, an amount data processing and computational complexity of the screen rendering process for the Right View is further significantly reduced.

At step 175, using computational results of the blending routines of steps 170A and 170B in a frame forming process, the 3D image contained in the inputted video data is visualized on an autostereoscopic display.

Alternatively, at step 180, using results of the blending routines of steps 170A and 170B, an anaglyph image is generated and, at step 185, the frame forming process produces the corresponding 3D image on a stereoscopic display.

In operation, the discussed above method steps are cyclically repeated to sequentially visualize, in a form of stereo graphics, images contained in inputted data streams.

In exemplary embodiments, the method 100 may be implemented in hardware, software, firmware, or any combination thereof in a form of a computer program product comprising one or more computer-executable instructions. When implemented in software, the computer program product may be stored on or transmitted using a computer-readable medium, which includes computer storage medium and computer communication medium.

The term "computer storage medium" refers herein to any medium adapted for storing the instructions that cause the computer to execute the method. By way of example, and not limitation, the computer storage medium may comprise solid-sate memory devices, including electronic memory devices (e.g., RAM, ROM, EEPROM, and the like), optical memory devices (e.g., compact discs (CD), digital versatile discs (DVD), and the like), or magnetic memory devices (e.g., hard drives, flash drives, tape drives, and the like), or other memory devices adapted to store the computer program product, or a combination of such memory devices.

The term "computer communication medium" refers herein to any physical interface adapted to transmit the computer program product from one place to another using for example, a modulated carrier wave, an optical signal, a DC or AC current, and the like means. By way of example, and not limitation, the computer communication medium may comprise twisted wire pairs, printed or flat cables, coaxial cables, fiber-optic cables, digital subscriber lines (DSL), or other wired, wireless, or optical serial or parallel interfaces, or a combination thereof.

Figure 2:
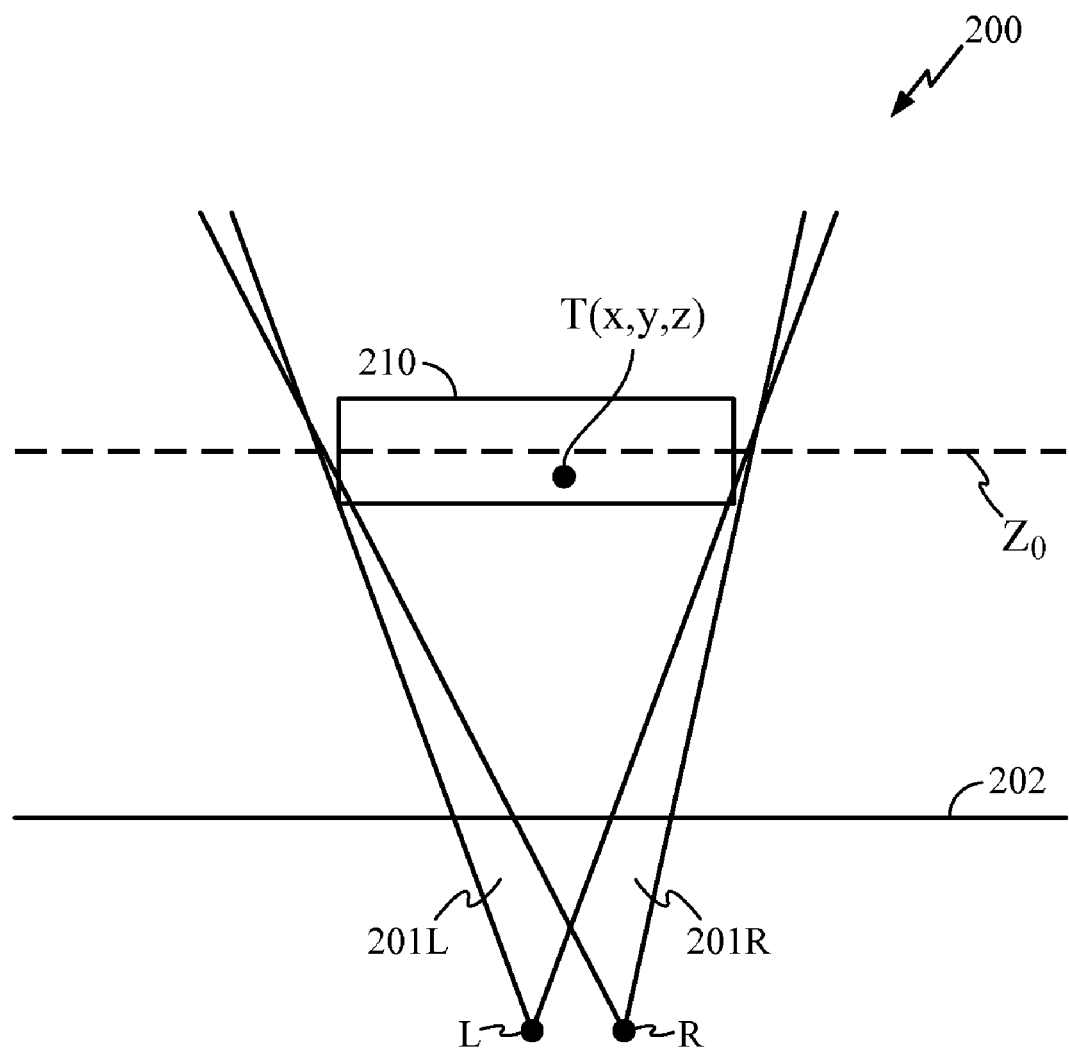
FIG. 2 shows a schematic diagram illustrating a method for determining a depth threshold during facet classification procedure used in the method of FIG. 1.

FIG. 2 shows a schematic diagram 200 illustrating a method for determining the depth threshold $Z_0$ during facet classification procedure used in the method 100 of FIG. 1. In particular, FIG. 2 depicts fields of sight 201L and 201R for the left (L) and right eyes of the viewer, a 3D point $T(x, y, z)$ in a displayed scene 210, a projection plane 202, and the depth threshold $Z_0$.

Coordinates T1 and T2 of projected points of the 3D point $T(x, y, z)$ on the projection plane 202 for the left (T1) and right (T2) eyes of the viewer may be calculated using the following equations:

$$T1 = \begin{bmatrix} x_1 \\ y_1 \end{bmatrix} = CA \begin{bmatrix} x \\ y \\ z \end{bmatrix}, \text{ and} \qquad \text{Eq. (1)}$$

$$T2 = \begin{bmatrix} x_2 \\ y_2 \end{bmatrix} = CB \begin{bmatrix} x \\ y \\ z \end{bmatrix}, \qquad \text{Eq. (2)}$$

where A and B are model-view transform matrixes of the 3D point $T(x, y, z)$ for the left and right eyes of the viewer, respectively, and C is the projection and screen mapping matrix.

When the 3D point $T(x, y, z)$ is located farther than the depth threshold $Z_0$, in the projection plane 202, the projected points overlap. Accordingly, when the 3D point $T(x, y, z)$ is located closer than the depth threshold $Z_0$, the projected points are shifted horizontally and, in the projection plane 202, a distance between these points defines a disparity $d=X1-X2$ between the Left and Right Views, where X1 and X2 are horizontal coordinates of T1 and T2. For the 3D points located beyond the depth threshold $Z_0$, the disparity is greater than 1 (i.e., $|d|>1$), and pixels corresponding to the Left and Right Views overlap.

Using the equations (1) and (2) and based on the monotonic property of the perspective viewing (i.e., an object monotonically appears smaller as the distance between the object and a viewer increases), the depth threshold $Z_0$ may be calculated by solving the equation $$T1 - T2 = \begin{bmatrix} 0 \\ 1 \end{bmatrix} = C(A-B) \begin{bmatrix} x \\ y \\ z \end{bmatrix}, \qquad \text{Eq. (4)}$$

and choosing a maximal component among m solutions $z_k$ of the equation (4) for sampling vertices in the displayed scene, i.e., $Z_0 = \max(z_1, z_2, \ldots x_m)$, wherein $1 \leq k \leq m$. A triangle facet generated during a 3D model-view transformation (steps 110A, 110B of the method 100) is classified as a foreground facet when all of its vertices are located closer than the depth threshold $Z_0$, otherwise the facet is classified as a background facet.

Figure 3:
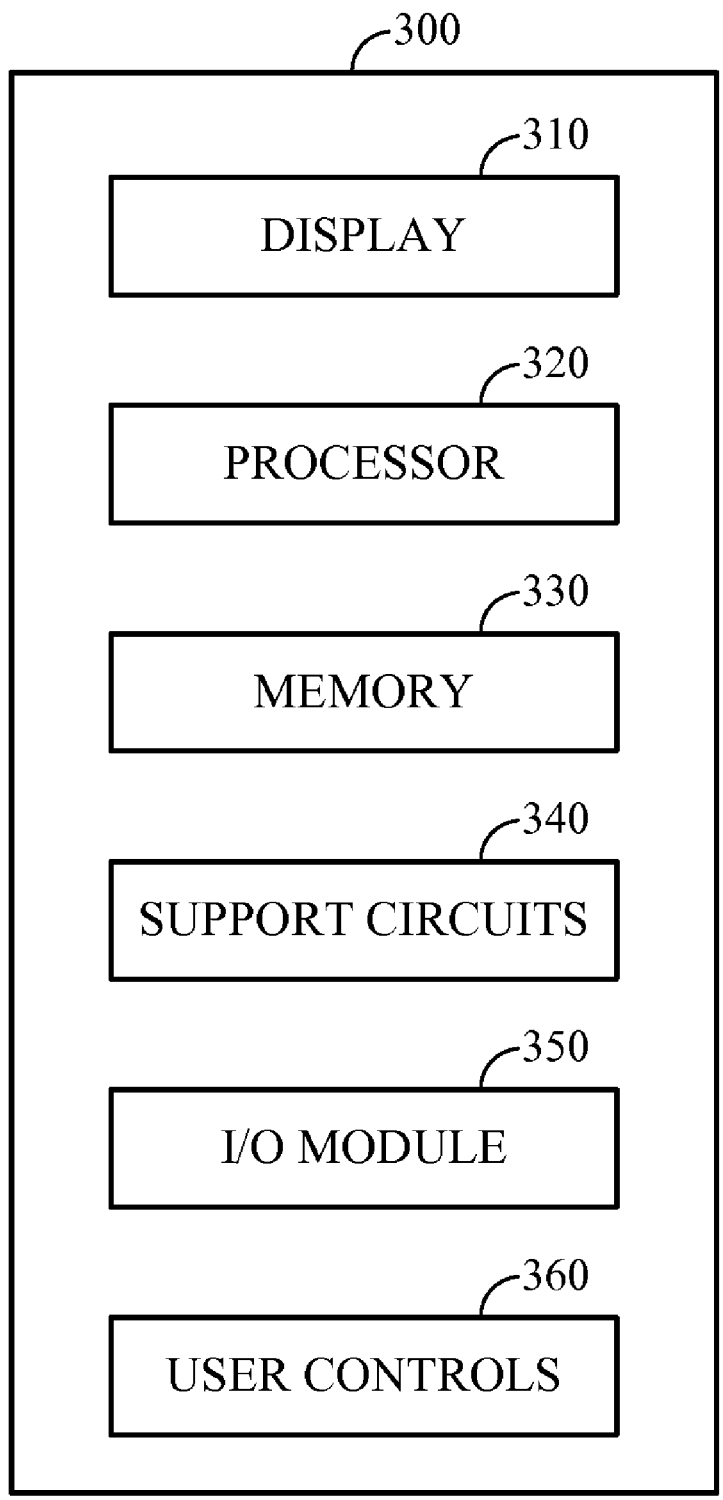
FIG. 3 shows a block diagram of an exemplary device adapted for using the method of FIG. 1.

FIG. 3 shows a block diagram of an exemplary device 300 adapted for using the method 100 of FIG. 1. Illustratively, the device 300 (e.g., a mobile phone, a mobile computer, a video game platforms, a Personal Digital Assistant (PDA) device, and the like) includes a stereoscopic or autostereoscopic display 310, a processor 320, a memory 330, support circuits 340, an input/output (I/O) module 350, and user controls 360.

The memory 330 (e.g., dynamic random excess memory (DRAM), hard drive, compact disc (CD), or any other electronic, magnetic, or optical computer readable medium) contains, among other program codes, a program code that, when executed by the processor 320, facilitates execution of the method 100. The support circuits 340 collectively include buses, circuits, and devices integrating functional components of the device 300 in an operable unit. Video data is provided to the device 300 via the input/output (I/O) module 350 and then processed by the processor 320 to generate stereo graphics imagery on the display 310.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples described herein but is to be accorded the widest scope consistent with the principles and novel features disclosed herein.

What is claimed is:

1. A method for rendering 3D video images on a stereo-enabled display, comprising:
    (a) during a 3D model-view transformation of video data:
        for a first view, culling facets facing away from a viewer;
        for the first view, classifying remaining facets corresponding to scene elements disposed closer than a pre-determined depth threshold as first foreground facets and remaining facets corresponding to the scene elements disposed beyond said threshold as first background facets; and
        for a second view, selectively defining second foreground facets corresponding to the scene elements disposed closer than said threshold and adopting the first background facets as second background facets;
    (b) determining lighting for the first foreground facets, the first background facets, and the second foreground facets;
    (c) performing screen mapping and scene rendering calculations for the first view based on the first foreground facets and the first background facets; and
    (d) performing screen mapping and scene rendering calculations for the second view based on the second foreground facets and the first background facets;
    wherein the method is performed by one or more video-processing devices.

2. The method of claim 1, wherein at least two of the steps (a)-(d) or portions thereof are performed in parallel or contemporaneously.

3. The method of claim 1, wherein the first view is a left view and the second view is a right view.

4. The method of claim 1, wherein the first view is a right view and the second view is a left view.

5. The method of claim 1, wherein the stereo-enabled display is a stereoscopic display.

6. The method of claim 1, further comprising:
generating an anaglyph image.

7. The method of claim 6, wherein the stereo-enabled display is an autostereoscopic display.

8. The method of claim 1, wherein the display is a portion of a battery-powered device.

9. The method of claim 8, wherein the battery-powered device comprises a mobile phone, a mobile computer, a video game platform, or a Personal Digital Assistant (PDA) device.

10. The method of claim 1, wherein the step (b) further comprises:
computing color properties for vertices of said facets.

11. The method of claim 1, wherein the step (c) further comprises:
performing a perspective 3D-to-2D transformation for the first foreground facets and the first background facets;
storing results of said transformation for the first background facets;
performing a shading routine to compute intensity values for pixels rendering portions of the first view that are visible to the viewer;
performing a Hidden Surface Removal (HSR) routine to remove portions of the first view that are invisible to the viewer; and
storing results of the HSR process for the first view.

12. The method of claim 11, wherein the step (d) further comprises:
performing the perspective 3D-to-2D transformation for the second foreground facets;
adapting results of said transformation for the first background facets;
performing a shading routine to compute intensity values for pixels rendering portions of the second view that are visible to the viewer;
removing portions of the second view that are invisible to the viewer using the results of the HSR routine for the first view; and
computing intensity values for pixels rendering portions of the second view that are visible to the viewer.

13. A computer program product including a non-transitory computer readable medium having instructions for causing a computer to render 3D video images on a stereo-enabled display by:
(a) during a 3D model-view transformation of video data:
for a first view, culling facets facing away from a viewer;
for the first view, classifying remaining facets corresponding to scene elements disposed closer than a pre-determined depth threshold as first foreground facets and remaining facets corresponding to the scene elements disposed beyond said threshold as first background facets; and
for a second view, selectively defining second foreground facets corresponding to the scene elements disposed closer than said threshold and adopting the first background facets as second background facets;
(b) determining lighting for the first foreground facets, the first background facets, and the second foreground facets;
(c) performing screen mapping and scene rendering calculations for the first view based on the first foreground facets and the first background facets; and
(d) performing screen mapping and scene rendering calculations for the second view based on the second foreground facets and the first background facets.

14. A method for rendering 3D video images on a stereo-enabled display, comprising:

(a) performing a 3D model-view transformation of video data for a left view to generate first facets;
(b) separating a first plurality of the first facets facing towards a viewer from a second plurality of the first facets facing away from the viewer;
(c) culling the second plurality of the first facets;
(d) in the first plurality of the first facets, separating first foreground facets corresponding to elements disposed closer than a pre-determined depth threshold from first background facets corresponding to elements disposed beyond said threshold;
(e) performing a 3D model-view transformation of the video data for a right view to selectively generate second foreground facets of the elements disposed closer than said threshold and adopting the first background facets as second background facets;
(f) determining lighting for the first foreground facets, the first background facets, and the second foreground facets;
(g) performing screen mapping and scene rendering calculations for the left view based on the first foreground facets and the first background facets; and
(h) performing screen mapping and scene rendering calculations for the right view based on the second foreground facets;
wherein the method is performed by one or more video-processing devices.

15. The method of claim 14, wherein at least two of the steps (a)-(h) or portions thereof are performed in parallel or contemporaneously.

16. The method of claim 14, wherein the stereo-enabled display is a stereoscopic display.

17. The method of claim 14, further comprising:
generating an anaglyph image.

18. The method of claim 17, wherein the stereo-enabled display is an autostereoscopic display.

19. The method of claim 14, wherein the display is a portion of a mobile phone, a mobile computer, a video game platform, or a Personal Digital Assistant (PDA) device.

20. The method of claim 14, wherein the step (f) further comprises:
computing color properties for vertices of said facets.

21. The method of claim 14, wherein the step (g) further comprises:
performing a perspective 3D-to-2D transformation for the first foreground facets and the first background facets;
storing results of said transformation for the first background facets;
performing a shading routine to compute intensity values for pixels rendering portions of the Left view that are visible to the viewer;
performing a Hidden Surface Removal (HSR) routine to remove portions of the Left view that are invisible to the viewer; and
storing results of the HSR process for the Left view.

22. The method of claim 21, wherein the step (h) further comprises:
performing the perspective 3D-to-2D transformation for the second foreground facets;
adapting results of said transformation for the first background facets;
performing a shading routine to compute intensity values for pixels rendering portions of the Right view that are visible to the viewer;
removing portions of the Right view that are invisible to the viewer using the results of the HSR routine for the Left view; and;

computing intensity values for pixels rendering portions of the Right view that are visible to the viewer.

23. A computer program product including a non-transitory computer readable medium having instructions for causing a computer to render 3D video images on a stereo-enabled display by:
   (a) performing a 3D model-view transformation of video data for a left view to generate first facets;
   (b) separating a first plurality of the first facets facing towards a viewer from a second plurality of the first facets facing away from the viewer;
   (c) culling the second plurality of the first facets;
   (d) in the first plurality of the first facets, separating first foreground facets corresponding to elements disposed closer than a pre-determined depth threshold from first background facets corresponding to elements disposed beyond said threshold;
   (e) performing a 3D model-view transformation of the video data for a right view to selectively generate second foreground facets of the elements disposed closer than said threshold and adopting the first background facets as second background facets;
   (f) determining lighting for the first foreground facets, the first background facets, and the second foreground facets;
   (g) performing screen mapping and scene rendering calculations for the left view based on the first foreground facets and the first background facets; and
   (h) performing screen mapping and scene rendering calculations for the right view based on the second foreground facets.

24. An apparatus for rendering 3D video images on a stereo-enabled display, comprising:
   a stereo-enabled display;
   a processor; and
   a memory storing a program code having instructions for causing the processor to:
   (a) during a 3D model-view transformation of video data:
      for a first view, culling facets facing away from a viewer;
      for the first view, classifying remaining facets corresponding to scene elements disposed closer than a pre-determined depth threshold as first foreground facets and remaining facets corresponding to the scene elements disposed beyond said threshold as first background facets; and
      for a second view, selectively defining second foreground facets corresponding to the scene elements disposed closer than said threshold and adopting the first background facets as second background facets;
   (b) determining lighting for the first foreground facets, the first background facets, and the second foreground facets;
   (c) performing screen mapping and scene rendering calculations for the first view based on the first foreground facets and the first background facets; and
   (d) performing screen mapping and scene rendering calculations for the second view based on the second foreground facets and the first background facets.

25. The apparatus of claim 24, wherein at least two of the steps (a)-(d) or portions thereof are performed in parallel or contemporaneously.

26. The apparatus of claim 24, wherein the first view is a left view and the second view is a right view.

27. The apparatus of claim 24, wherein the first view is a right view and the second view is a left view.

28. The apparatus of claim 24, wherein said apparatus is a mobile phone, a mobile computer, a video game platform, or a Personal Digital Assistant (PDA) device.

29. The apparatus of claim 24, wherein the stereo-enabled display is a stereoscopic display or an autostereoscopic display.

30. The apparatus of claim 24, wherein the step (b) further comprises:
   computing color properties for vertices of said facets.

31. The apparatus of claim 24, wherein the step (c) further comprises:
   performing a perspective 3D-to-2D transformation for the first foreground facets and the first background facets;
   storing results of said transformation for the first background facets;
   performing a shading routine to compute intensity values for pixels rendering portions of the first view that are visible to the viewer;
   performing a Hidden Surface Removal (HSR) routine to remove portions of the first view that are invisible to the viewer; and
   storing results of the HSR process for the first view.

32. The apparatus of claim 31, wherein the step (d) further comprises:
   performing the perspective 3D-to-2D transformation for the second foreground facets;
   adapting results of said transformation for the first background facets;
   performing a shading routine to compute intensity values for pixels rendering portions of the second view that are visible to the viewer;
   removing portions of the second view that are invisible to the viewer using the results of the HSR routine for the first view; and;
   computing intensity values for pixels rendering portions of the second view that are visible to the viewer.

33. A method for rendering 3D video images on a stereo-enabled display, comprising:
   (a) during a 3D model-view transformation of video data for a first view:
      classifying facets corresponding to scene elements disposed closer than a pre-determined depth threshold as first foreground facets and facets corresponding to the scene elements disposed beyond said threshold as first background facets;
   (b) during a 3D model-view transformation of video data for a second view:
      determining second foreground facets and second background facets;
      culling the second background facets; and
      adopting the first background facets;
   (c) determining lighting for the first and second foreground facets and the first background facets; and
   (d) performing screen mapping and scene rendering calculations for the first view based on the first foreground facets and the first background facets; and
   (e) performing screen mapping and scene rendering calculations for the second view based on the second foreground facets and the first background facets;
   wherein the method is performed by one or more video-processing devices.

34. The method of claim 33, wherein at least two of the steps (a)-(e) or portions thereof are performed in parallel or contemporaneously.

35. The method of claim 33, wherein the first view is a left view and the second view is a right view.

36. The method of claim 33, wherein the first view is a right view and the second view is a left view.

37. The method of claim 33, wherein the step (a) further comprises at least one of:
culling facets facing away from a viewer; and
culling facets corresponding to scene elements disposed beyond a pre-determined depth threshold.

38. An apparatus for rendering 3D video images on a stereo-enabled display, comprising:
a stereo-enabled display;
a processor; and
a memory storing a program code having instructions for causing the processor to:
(a) during a 3D model-view transformation of video data for a first view:
classifying facets corresponding to scene elements disposed closer than a pre-determined depth threshold as first foreground facets and facets corresponding to the scene elements disposed beyond said threshold as first background facets;
(b) during a 3D model-view transformation of video data for a second view:
determining second foreground facets and second background facets;
culling the second background facets; and
adopting the first background facets;
(c) determining lighting for the first and second foreground facets and the first background facets; and
(d) performing screen mapping and scene rendering calculations for the first view based on the first foreground facets and the first background facets; and
(e) performing screen mapping and scene rendering calculations for the second view based on the second foreground facets and the first background facets.

39. The apparatus of claim 38, wherein at least two of the steps (a)-(e) or portions thereof are performed in parallel or contemporaneously.

40. The apparatus of claim 38, wherein the first view is a left view and the second view is a right view.

41. The apparatus of claim 38, wherein the first view is a right view and the second view is a left view.

42. The apparatus of claim 38, wherein the step (a) further comprises at least one of:
culling facets facing away from a viewer; and
culling facets corresponding to scene elements disposed beyond a pre-determined depth threshold.

43. A computer program product including a non-transitory computer readable medium having instructions for causing a computer to render 3D video images on a stereo-enabled display by:
(a) during a 3D model-view transformation of video data for a first view:
classifying facets corresponding to scene elements disposed closer than a pre-determined depth threshold as first foreground facets and facets corresponding to the scene elements disposed beyond said threshold as first background facets;
(b) during a 3D model-view transformation of video data for a second view:
determining second foreground facets and second background facets;
culling the second background facets; and
adopting the first background facets;
(c) determining lighting for the first and second foreground facets and the first background facets; and
(d) performing screen mapping and scene rendering calculations for the first view based on the first foreground facets and the first background facets; and
(e) performing screen mapping and scene rendering calculations for the second view based on the second foreground facets and the first background facets.

44. An apparatus for rendering 3D video images on a stereo-enabled display, comprising:
a processor; and
a memory storing a program code having instructions for causing the processor to:
(a) perform a 3D model-view transformation of video data for a left view to generate first facets;
(b) separate a first plurality of the first facets facing towards a viewer from a second plurality of the first facets facing away from the viewer;
(c) cull the second plurality of the first facets;
(d) in the first plurality of the first facets, separate first foreground facets corresponding to elements disposed closer than a pre-determined depth threshold from first background facets corresponding to elements disposed beyond said threshold;
(e) perform a 3D model-view transformation of the video data for a right view to selectively generate second foreground facets of the elements disposed closer than said threshold and adopting the first background facets as second background facets;
(f) determine lighting for the first foreground facets, the first background facets, and the second foreground facets;
(g) perform screen mapping and scene rendering calculations for the left view based on the first foreground facets and the first background facets; and
(h) perform screen mapping and scene rendering calculations for the right view based on the second foreground facets.

45. The apparatus of claim 44, wherein at least two of the steps (a)-(h) or portions thereof are performed in parallel or contemporaneously.

46. The apparatus of claim 44, wherein the stereo-enabled display is a stereoscopic display.

47. The apparatus of claim 44, wherein the program code has further instructions for causing the processor to generate an anaglyph image.

48. The apparatus of claim 47, wherein the stereo-enabled display is an autostereoscopic display.

49. The apparatus of claim 44, wherein the display is a portion of a mobile phone, a mobile computer, a video game platform, or a Personal Digital Assistant (PDA) device.

50. The apparatus of claim 44, wherein the step (f) further comprises:
computing color properties for vertices of said facets.

51. The apparatus of claim 44, wherein the step (g) further comprises:
performing a perspective 3D-to-2D transformation for the first foreground facets and the first background facets;
storing results of said transformation for the first background facets;
performing a shading routine to compute intensity values for pixels rendering portions of the left view that are visible to the viewer;
performing a Hidden Surface Removal (HSR) routine to remove portions of the left view that are invisible to the viewer; and
storing results of the HSR process for the left view.

52. The apparatus of claim 51, wherein the step (h) further comprises:

performing the perspective 3D-to-2D transformation for the second foreground facets;
adapting results of said transformation for the first background facets;
performing a shading routine to compute intensity values for pixels rendering portions of the right view that are visible to the viewer;

removing portions of the right view that are invisible to the viewer using the results of the HSR routine for the left view; and;
computing intensity values for pixels rendering portions of the right view that are visible to the viewer.

* * * * *

UNITED STATES PATENT AND TRADEMARK OFFICE
CERTIFICATE OF CORRECTION

| | | |
|---|---|---|
| PATENT NO. | : 7,982,733 B2 | Page 1 of 1 |
| APPLICATION NO. | : 11/620621 | |
| DATED | : July 19, 2011 | |
| INVENTOR(S) | : Wang et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1224 days.

Signed and Sealed this
Twenty-second Day of November, 2011

David J. Kappos
*Director of the United States Patent and Trademark Office*